(12) United States Patent
Asahi et al.

(10) Patent No.: US 7,225,340 B2
(45) Date of Patent: May 29, 2007

(54) DIGITAL COPYING METHOD AND STORAGE DEVICE FOR DIGITAL CONTENT

(75) Inventors: Takeshi Asahi, Tokyo (JP); Jun Kitahara, Tokyo (JP); Toru Owada, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 641 days.

(21) Appl. No.: 10/013,607

(22) Filed: Dec. 10, 2001

(65) Prior Publication Data

US 2002/0114455 A1 Aug. 22, 2002

(30) Foreign Application Priority Data

Feb. 20, 2001 (JP) ............... 2001-042891

(51) Int. Cl.
*H04L 9/32* (2006.01)
*H04L 9/28* (2006.01)
(52) U.S. Cl. ........................................ 713/193; 380/28
(58) Field of Classification Search ........ 380/201–204; 713/200
See application file for complete search history.

(56) References Cited

U.S. PATENT DOCUMENTS

| | | | |
|---|---|---|---|
| 5,991,500 A * | 11/1999 | Kanota et al. ............ | 386/94 |
| 6,334,186 B1 * | 12/2001 | Uematsu ................. | 713/168 |
| 6,598,164 B1 * | 7/2003 | Shepard ................. | 713/189 |
| 6,711,553 B1 * | 3/2004 | Deng et al. ............. | 705/57 |
| 6,748,537 B2 * | 6/2004 | Hughes ................. | 713/193 |
| 6,862,582 B2 * | 3/2005 | Harada et al. ........... | 705/51 |

* cited by examiner

*Primary Examiner*—Nasser Moazzami
*Assistant Examiner*—Pramila Parthasarathy
(74) *Attorney, Agent, or Firm*—Townsend and Townsend and Crew LLP

(57) ABSTRACT

The present invention provides a digital copying method for preventing complete copying by the use of digital copying. A data generating portion includes a storage device which generates a plurality of digital copies having mutually different amounts of effective information from original digital data, and stores the set of digital content having the digital copies encrypted different numbers of times in a memory. A digital output portion decrypts the set of digital content retrieved from the memory a prescribed number of times, making usable and outputting one of the digital copies in the set of digital content. An analog output portion extracts the digital copy that has been encrypted zero times from the set of digital content, converts that copy to analog data, and outputs that data.

13 Claims, 10 Drawing Sheets

DIGITAL COPYING METHOD AND STORAGE DEVICE FOR DIGITAL CONTENT

CROSS-REFERENCES TO RELATED APPLICATIONS

This application is related to and claims priority from Japanese Patent Application No. 2001-042891 filed on Feb. 20, 2001.

BACKGROUND OF THE INVENTION

The present invention relates to a method and device for protecting digital content, and more particularly to a digital copying method and storage device for digital content whereby the quality of the digital content deteriorates when a digital copy is made.

With the dissemination of information technology and the development of networks, the network transmission of digital content, such as music or still or moving images, has become very common. Copyright protection has become a problem of this transmission of digital content. When analog data is copied, the quality of the copy is degraded compared to that of the source. However, digital data can be copied many times with no deterioration of the quality. Consequently, there are no limits to the copying of digital data and it is possible to repeat the copying process and endlessly create data of the same quality as the original data. Moreover, with the realization of today's multi-functional PCs (personal computers), it has become possible to playback music and image content onto a personal computer. On a PC, it is possible to perform various operations that are not possible with devices exclusively for playing back content, such as CD or DVD players. The content data can be copied directly from the CD or DVD. Also, data that has been copied into the PC once can be easily produce many unauthorized copies.

Before now, music and image content was played with dedicated playback devices such as CD or DVD players. It was possible to control the permission to copy the digital content with the dedicated playback devices. For example, the content was encrypted and protected with CSS (Content Scramble System) on DVD. With encrypted content data, the content cannot be played back without a decryption key to cancel the encryption, even if removed directly from the medium. Also, with CGMS (Copy Generation Management System), copy generation management of the content can be performed so that copying from the original is permitted, but copying from a copy is not permitted.

In the case of the above mentioned methods, the copying of digital content has no flexibility and either a complete copy is possible or no copy can be made at all. Here, a complete copy is a copy of a quality such that the content user cannot perceive a difference in quality between the digital content of the copy source and the digital content of the copy destination. If there is no flexibility in the copying of digital content, such as if it were made impossible to make a copy from content data of a generation for which copying is not permitted, a user of the digital content might be limited in making copies for personal use, which was originally possible. It is possible to make a complete copy, for which the quality of the content is not changed at all, from content data of a generation for which copying is permitted. In the case of fraudulently repeating the copying process, however, this is a problem from the perspective of copyright protection.

There is a need for a method for copying digital content, to prevent digital copying of complete copies, for protecting the rights of the creators of digital content while supporting the desire of users to acquire digital content.

SUMMARY OF THE INVENTION

In accordance with the invention, digital content is generated by producing copies of a first digital content and encrypting each copy. At least some of the copies have a lower level of quality than other copies. The digital content comprises the set of encrypted copies. Further in accordance with the invention, the digital content so produced is copied by decrypting the digital content. The result is a set of digital content comprising an unencrypted copy and one or more encrypted copies.

DETAILED DESCRIPTION OF THE EMBODIMENTS

The illustrative embodiments of the present invention are explained using the drawings.

A first data generating method relating to the present invention is explained. The first data generating method relating to the present invention comprises: generating a plurality of copies of encoded digital content of different levels of quality; using encryption to limit the usable encoded digital content of each copy; and combining the encrypted copies to generate a set of encrypted encoded digital content.

Figure 1:
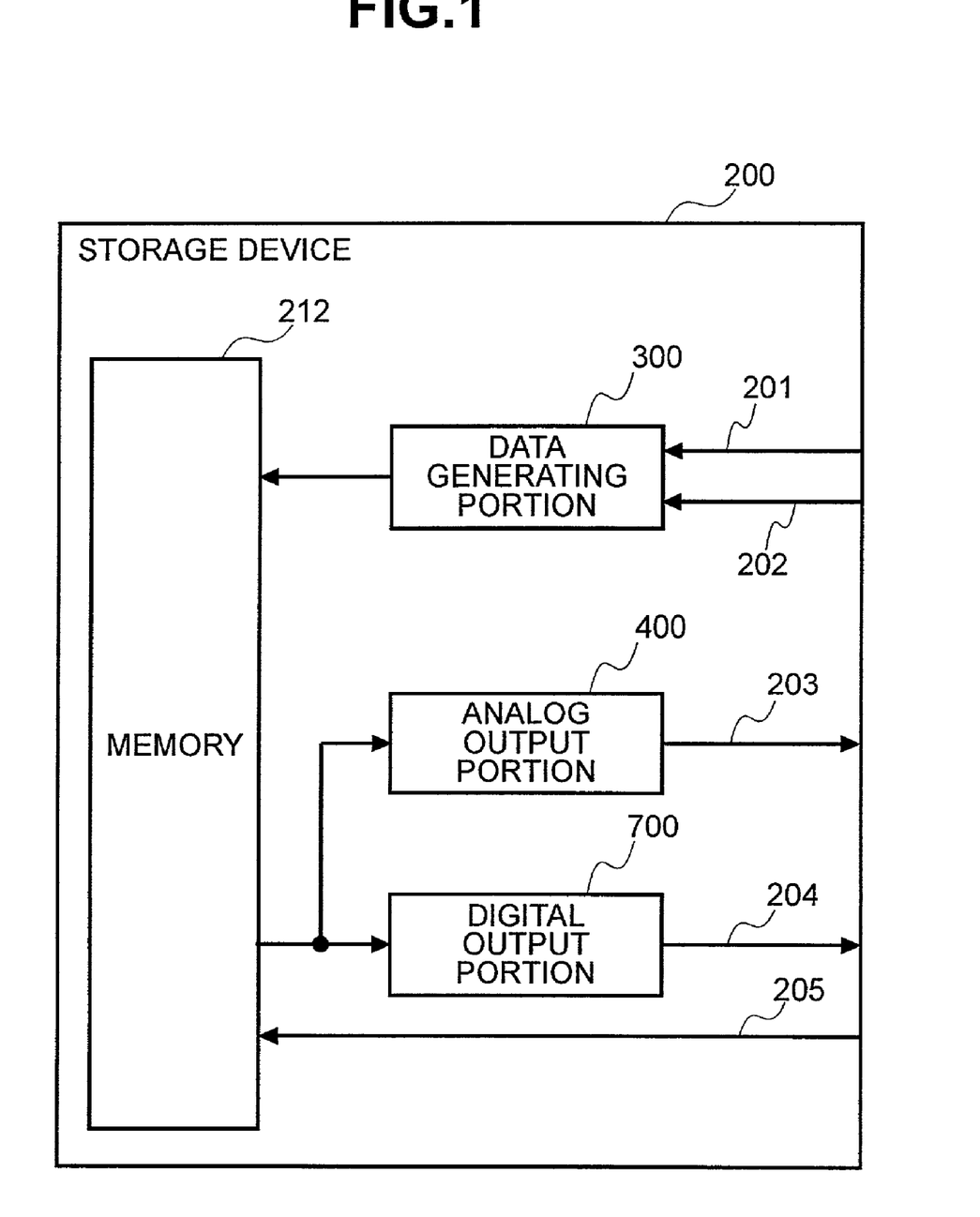
FIG. 1 is a drawing showing the constitution of the storage device 200 relating to the embodiment.

FIG. 1 shows the constitution of a storage device 200 for registering digital content and putting out copies of the registered digital content. The memory 212 is a mechanism for storing the registered digital content. The data generating portion 300 is a mechanism for storing a set of the content, generated by encrypting the original content, which has been input from the digital content input 201 or analog content input 202 and digitized, zero times, one time, two times, to the memory 212. The digital output portion 700 takes the content from the memory 212, decrypts the content once only, and outputs the content from the digital copy output 204. The analog output portion 400 takes the set of content from the memory 212, extracts content that is not encrypted from the set of content, converts it to analog content, and outputs it from the analog content output 203. The digital copy input 205 inputs and stores to the memory 212 a copy of the set of content output from the digital copy output 204 of the storage device 200 or a set of content output from a storage device 200 of another copy source. The set of content stored in the memory 212 is not directly output outside this system as digital data. This is to prevent the digital copying of complete copies of the digital content.

Moreover, the memory 212 does not specify a physical medium. Also, the storage device 200 may be realized with a computer system including the memory 212, a storage subsystem, a digital content storage device, a digital content playback device, or the like.

Figure 2:
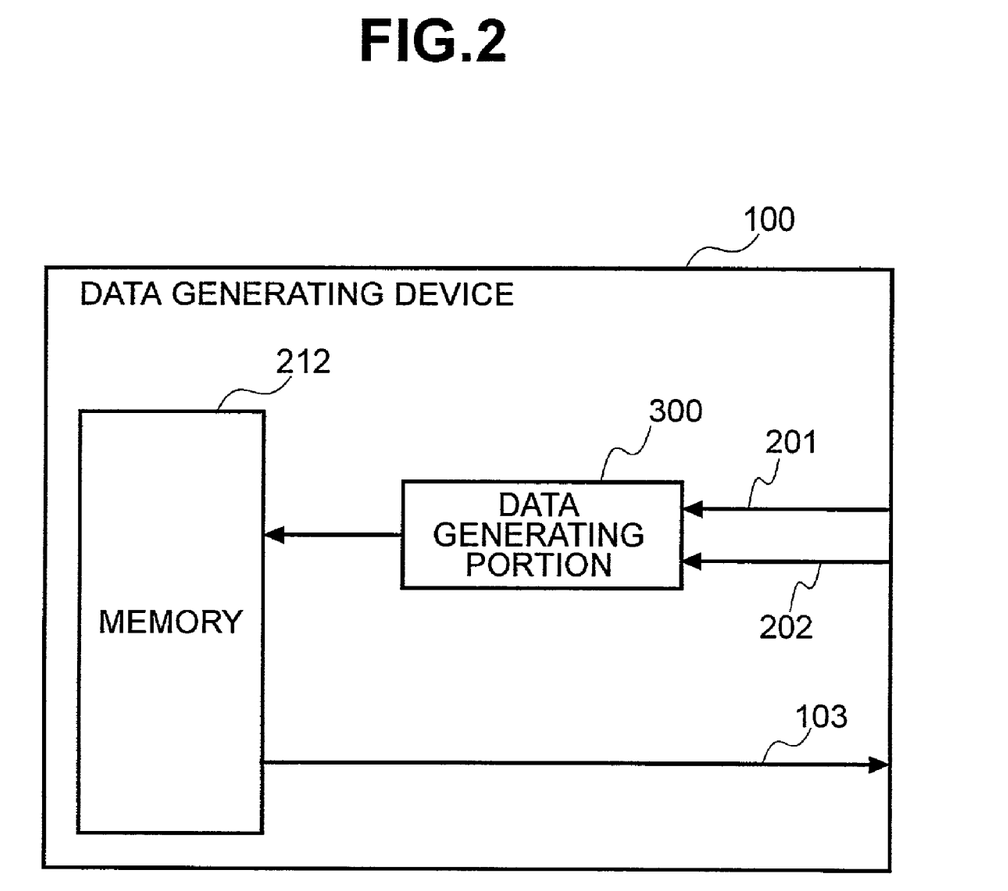
FIG. 2 is a drawing showing the constitution of the data generating device 100 relating to the embodiment.

FIG. 2 is a drawing of a constitution wherein the data generating device 100 comprises a section of the storage device 200 having the data generating portion 300 as its core. The data generating portion 300 converts the digital content input from the digital content input 201 or the analog content input from the analog content input 202 to a set of encrypted encoded digital content and stores this set to the memory 212. This set of encrypted encoded digital content is a collection of a plurality of copies of encrypted encoded digital content of mutually different qualities. This set of encrypted encoded digital content stored in the memory 212 is output from the data output 103. The digital output can be recorded (stored) in non-volatile form, such as digital tape, digital compact disc, or the like. The data generating device preferably is available only to the originator of the content (e.g., artist, production house, manufacturing facility, and so on).

Figure 3:
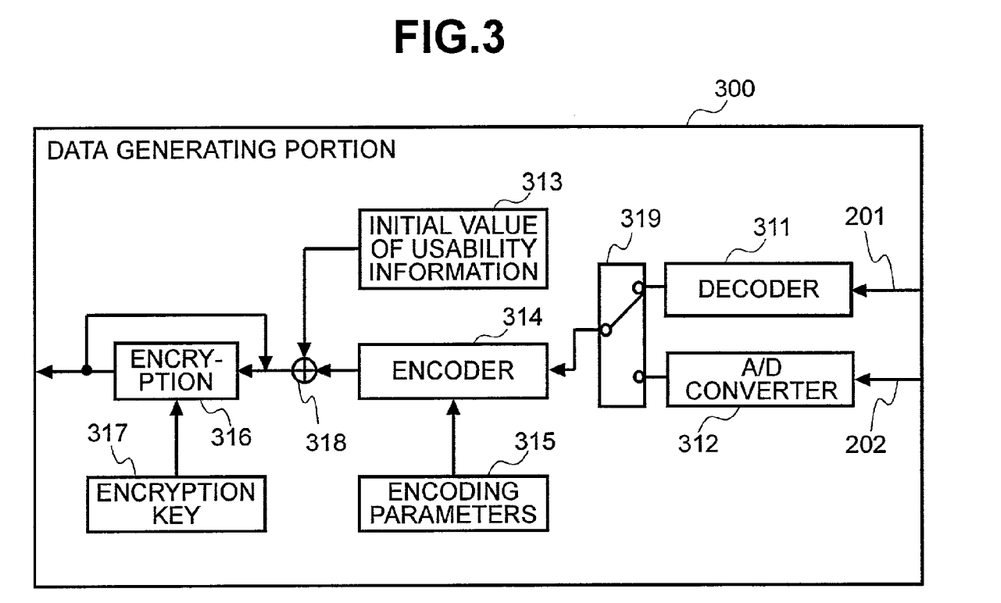
FIG. 3 is a drawing showing the internal constitution of the data generating portion 300 relating to the embodiment.

FIG. 3 is a drawing showing the internal constitution of the data generating portion 300. The decoder 311 decodes the digital content encoded by data compression and input from the digital content input 201 and outputs the decoded content to the selector 319. The A/D converter 312 converts the input from the analog content input 202 to digital content data and outputs the data to the selector 319. The selector 319 outputs the input from the decoder 311 or the input from the AID converter 312 to the encoder 314. The encoding parameter generator 315 outputs one or more encoding parameters to the encoder 314. The encoder 314 converts the input from the selector 319 to produce one or more copies of encoded digital content on the basis of the one or more encoding parameters input from the encoding parameter generator 315 and outputs the encoded content which is then supplied to the encryption mechanism 316. Each copy of encoded digital content supplied to the encryption mechanism 316 is an encoded version of the digital content received at the digital content input 201 that has been encoded based on the encoding parameter.

In one embodiment, the encoder 314 applies each of the one or more encoding parameters to the input received from the encoding parameter generator 315 to produce the one or more copies of encoded digital content. Alternatively, each successive copy of encoded digital content may be produced from a preceding copy of encoded digital content. Thus, for example, a first encoding parameter is applied to the input received from the encoding parameter generator 315 to produce a first copy of encoded digital content. Next, a second encoding parameter is applied to the first copy of encoded digital content to produce a second copy encoded digital content. A third encoding parameter is applied to the second copy of encoded digital content to produce a third copy of encoded digital content, and so on. Variations of this alternative are possible; for example, the same encoding parameter can be used to produce the second and third (and subsequent) encoded digital content.

At this time, the portion 318 for adding the initial value of the usability information adds the initial value of the usability information output from the initial value of usability information storing portion 313 to the encoded digital content. The encryption key storing portion 317 outputs the encryption key to the encryption mechanism 316. The encryption mechanism 316 further encrypts the one or more copies of encoded digital content output by the encoder 314 and the encrypted encoded digital content output by the encryption mechanism 316 and outputs and stores this content to the memory 212. Each copy of encrypted digital content is an encrypted version of the digital content received by the encryption mechanism 316 that has been encrypted one or more times.

Figure 4:
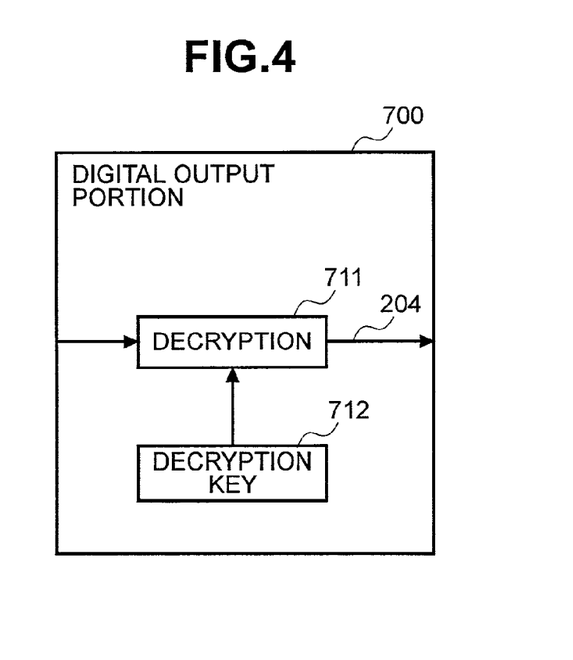
FIG. 4 is a drawing showing the internal constitution of the digital output portion 700 relating to the embodiment.

FIG. 4 is a drawing showing the internal constitution of the digital output portion 700. The decryption mechanism 711 decrypts and outputs (204) the encrypted encoded digital content one time using the decryption key output by the decryption key storing portion 712. The digital output 204 can be recorded (stored) in non-volatile form, such as digital tape, digital compact disc, or the like.

The encryption key output by the encryption key storing portion 317 and the decryption key output by the decryption key storing portion 712 may be established at the time of the production of the storage device 200 or may be set from outside the system. The decryption key storing portion 712 outputs the set decryption key. When symmetrical key encryption is used as the encryption algorithm by the encryption mechanism 316 and the decryption mechanism 711, the encryption key set in the encryption key storing portion 317 and the decryption key set in the decryption key storing portion 712 are identical values. In that case, encryption key storing portion 317 and decryption key storing portion 712 may be combined into one because they output the same value.

Figure 5:
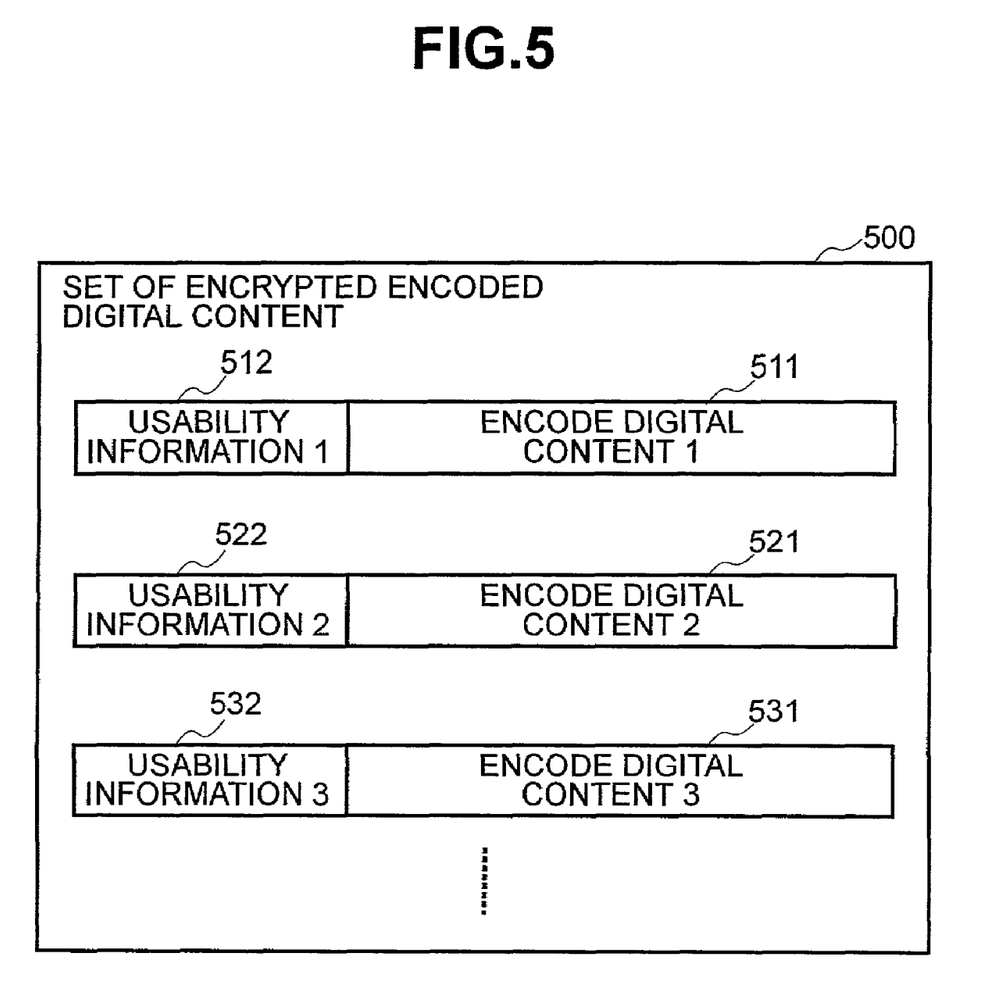
FIG. 5 is a drawing showing the data structure of the encrypted set of encoded digital content 500 relating to the embodiment.

FIG. 5 is a drawing showing the data structure of the set of encrypted encoded digital content 500. The set of encrypted encoded digital content 500 includes one or more copies of encoded digital content 1 (511), 2 (521), 3 (531). Each copy of encoded digital content comprises usability information 1 (512), 2 (522), 3 (532). The usability information is used as a header for determining whether the encoded digital content is usable. The copies of encoded digital content 1 (511), 2 (521), 3 (531) are content which have been encrypted zero times, once, and twice respectively, along with the usability information 1 (512), 2 (522), 3 (532) associated with each. The quality thereof deteriorates in ascending order. The set of encrypted encoded digital content 500 is arranged in the following order: usability information 1 (512), encoded digital content 1 (511), usability information 2 (522), encoded digital content 2 (521), usability information 3 (532), and encoded digital content 3 (531). The usability information 1 (512), 2 (522), 3 (532) have the same set length and match the block size of the encryption algorithm used in the encryption mechanism. The block size of the encryption algorithm is the smallest unit of data to be encrypted or decrypted. The encoded digital content 1 (511), 2 (521), 3 (531) are each of variable length, and each stores its data size as encoding information. Consequently, the position of each copy of encoded digital content within the set of encrypted encoded digital content can be found from the data size of the initial copy of encoded digital content. Also, the encoding information of the encoded digital content stores the encoding format, data size, sampling rate, and quantum bit number.

It is noted that the level of quality does not have to decrease with each successive copy of digital content, as indicated in FIG. 5. It may be desirable that the level of quality decreases with each successive copy of digital content other than in the manner shown in FIG. 5. For example, first and second copies may have the same level of quality, while a third copy has a decreased level of quality, and a fourth copy has an even lower level of quality. As another example, a first copy may have a level of quality that is 'lower' than a second copy. In accordance with the invention, the level of quality varies among the copies of digital content in the set of encrypted encoded digital content, but is not limited to how the level of quality is distributed among the copies.

The operation of each portion is explained below. The data generating device 100 processes the digital content input from the digital content input 201 or the analog content input from the analog content input 202 with the data generating portion 300, generates a set of encrypted encoded digital content and stores this set in the memory 212. The set of encrypted encoded digital content stored in the memory 212 is output from the data output 103.

Next the processing in the data generating portion 300 is discussed. When the input content is digital content, digital content encoded with data compression is first decoded by the decoder 311. The data format of digital content which can be input to the data generating device 100 is a data format that can be decoded by the decoder 311. The decoder 311 may also be replaced to match a data format which can be input. When the input content is analog content, the analog content is first converted to digital content by the A/D converter 312. The encoder 314 encodes the decoded, or converted by the A/D converter, digital content with one or more encoding parameters into encoded digital content with one or more levels of quality. The encoding parameters are parameters for determining the quality of digital content when the digital content is encoded. Quality is determined by encoding parameters such as the quantum bit number or sampling rate. The level of quality when the digital content is played back corresponds to the amount of effective information per unit playback time. The amount of effective information is based on the original content information and can be quantified by a percentage of the original content information retained in a copy of that content. For example, an amount of effective information of 50% means that, for any encoding system, the copied content retains 50% of the amount of information of the original content and the remaining 50% is meaningless information not found in the original. The encoding parameters are generated by the encoding parameter generator 315. The encoding parameters generated by the encoding parameter generator 315 can be provided from outside the system.

A method for generating the set of the encrypted encoded digital content 500 shown in FIG. 5 from digital content, which has been decoded by the decoder 311 or converted by the A/D converter 312, will be discussed as an example. The digital content is encoded into the encoded digital content 1 (511), 2 (521), 3 (531) using three encoding parameters. The number of copies of encoded digital content may be a number other than three. Also, analog content which is to undergo A/D conversion by the A/D converter 312 may be used instead of the digital content decoded by the decoder 311. Of the three copies of encoded digital content, the encoded digital content 1 (511) has the highest quality, the encoded digital content 2 (521) has been next best level of quality, and the encoded digital content 3 (531) has the lowest level of quality. An initial value V is added as the usability information 1 (512), 2 (522), 3 (532) to each copy of encoded digital content 1 (511), 2 (521), 3 (531) by the portion 318 for adding usability information. The initial value V of the usability information is stored in the storing portion 313 for the initial value of the usability information. The usability information undergoes encryption and decryption as part of the encoded digital content and its value changes. When encryption and decryption have been performed the same number of times on the encoded digital content, the usability information becomes equal to the initial value V and shows that the encoded digital content is usable. When encryption and decryption have been performed different numbers of times on the encoded digital content, the usability information becomes a value different from the initial value V and shows that the content is not usable.

The encoded digital content with the added usability information is then encrypted by the encryption mechanism 316. Encryption is performed with symmetrical key encryption. Symmetrical key encryption is an encryption algorithm wherein the same key K is used for encryption and decryption. The encryption mechanism 316 can perform encryption a plurality of times using same key K by using the output as input. The key K is stored in the encryption key storing portion 317 and output to the encryption mechanism 316. The encryption mechanism 316 encrypts the encoded digital content 1 (511), 2 (521), 3 (531) zero times, once, and twice respectively using counter control. The encrypted encoded digital content is collected and stored in the memory 212 as the set of encrypted encoded digital content 500 shown in FIG. 5.

Encryption and decryption are paired processes. When the encoded digital content is encrypted a certain number of times with the key K, the original encoded digital content can be used if decrypted the same number of times using the key K. With encoded digital content for which either encryption or decryption has been performed a greater number of times, it is difficult to use the original encoded digital content because the encryption or decryption which has been performed a greater number of times corresponds to the state of having been performed the difference between those numbers of times. Consequently, by decrypting the encoded digital content contained in the set of encrypted encoded digital content 500 different numbers of times, only the encoded digital content for which the number of encryptions and number of decryptions match can be used.

More precisely, the set of encrypted encoded digital content 500 is generated by the data generating portion 300 and stored in memory 212. At that stage, the encoded digital content 1 (511) is usable because it has not been encrypted. However, the encoded digital content 2 (521) and 3 (531) are not usable because they have been encrypted. When the entire set of encrypted encoded digital content 500 is decrypted one time, the encoded digital content 2 (521) becomes usable because the numbers of encryptions and decryptions are equal. The encoded digital content 1 (511) is unusable because it is in a state where decryption has been performed one more time than encryption; the encoded digital content 3 (531) is unusable because it is in a state where encryption has been performed one more time than decryption. When the set of encrypted encoded digital content 500 is decrypted twice, the encoded digital content 3 (531) becomes usable because the numbers of encryptions and decryptions are equal. However, the encoded digital content 1 (511) is unusable because it is in a state where decryption has been performed two times more than encryption; and the encoded digital content 2 (521) is unusable because it is in a state where decryption has been performed one time more than encryption.

Consequently, the quantity of usable content included in the set of encrypted encoded digital content 500 can be limited. Furthermore, by decrypting the set of encrypted encoded digital content 500 one time when it is copied, the usable encoded digital content can be changed. In this instance, information regarding the number of generations of the copy from the original is not necessary.

Accordingly, with the first data generating method relating to the present invention, the person who created the content sets a plurality of different encoding parameters and by generating the set of encrypted encoded digital content 500, can generate a set of encrypted encoded digital content 500 wherein the playback contents are changed when it is decrypted and copied. Furthermore, the correspondence between the number of times a copy is made, meaning the number of times it is decrypted, and the usable encoded digital content can be determined when the set of encrypted encoded digital content is generated.

A first copying method relating to the present invention is explained next. In the first copying method relating to the present invention, the usable encoded digital content in the set of encrypted encoded digital content stored in the memory 212 of the copy source storage device 200 is made unusable by being decrypted and other encoded digital content is made usable and output to the copy destination storage device 200, whereby digital copying of a complete copy is prevented.

The digital output portion 700 shown in FIG. 4 changes the usable encoded digital content by decrypting the set of encrypted encoded digital content stored in the memory 212 one time and outputs the decrypted set of encoded digital content from the digital copy output 204.

Figure 6:
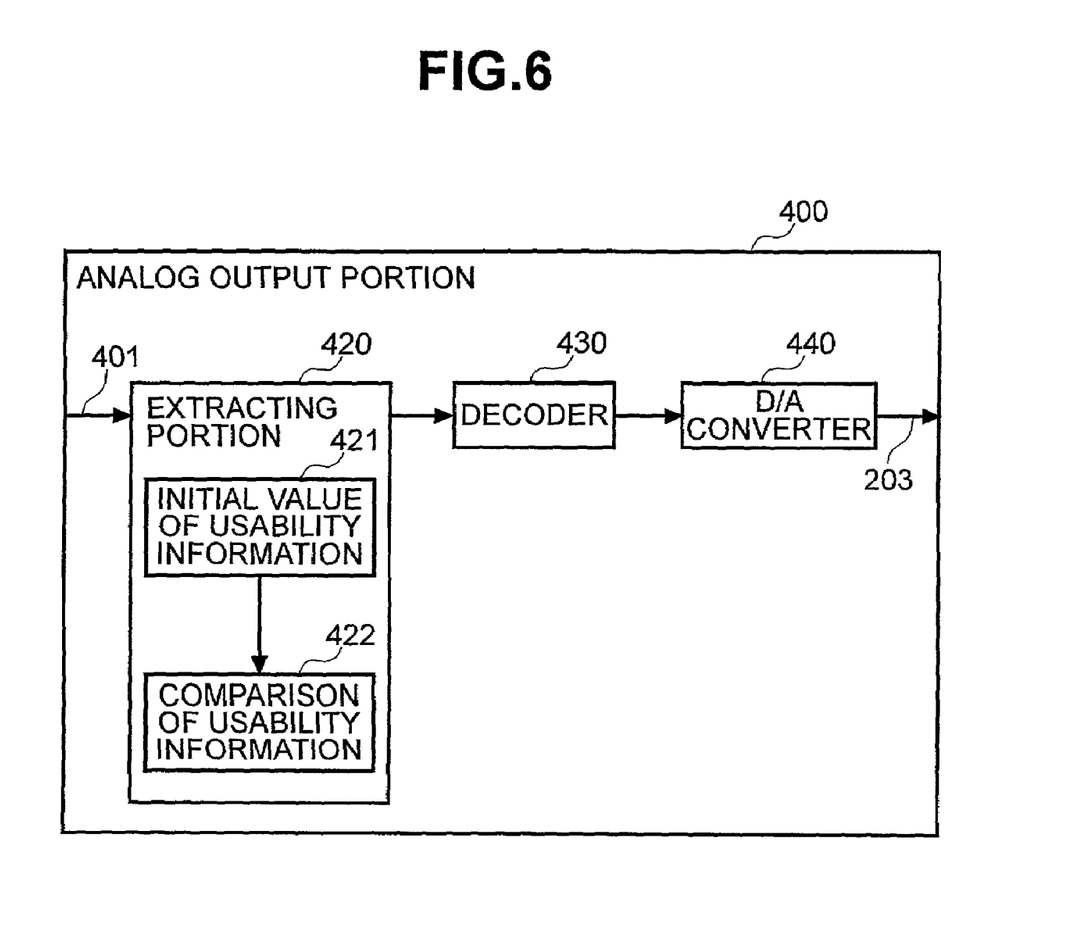
FIG. 6 is a drawing showing the internal constitution of the analog output portion 400 relating to the embodiment.

The analog output portion 400 shown in FIG. 6 extracts usable encoded digital content from the set of encrypted encoded digital content stored in memory 212, decodes the extracted encoded digital content, and plays back the content as analog content from the analog content output 203. The encoded digital content extracting portion 420 checks the usability information of each copy of encoded digital content included in the set of encrypted encoded digital content input and outputs the usable encoded digital content to the decoder 430. For example, when the set of encrypted encoded digital content shown in FIG. 5 is copied for the first time, usability information 1 (512) is the initial value V and shows that the content is usable; therefore, the encoded digital content 1 (511) is usable. The decoder 430 decodes the encoded digital content output by the encoded digital content extracting portion 420 and outputs the digital content to the D/A converter 440. The D/A converter 440 performs D/A conversion of the digital content output by the decoder 430 and outputs the results from the analog content output 203.

The output of the set of encrypted encoded digital content 500 stored in the memory 212 includes analog output for playing back the content and digital output for copying the content.

When the object is to playback the content, the content is output in analog form using output devices such as a display or speakers. When the content is output in a usable digital format in the state where it is not protected by encryption or the like outside of the storage device 200, it becomes possible to make a copy of the same quality as the original by digital copying. In order to prevent such digital copying, output with the object of playing back the content from the storage device 200 is only in an analog format from the analog output portion 400.

When the object is to make a copy of the content, outputting the set of encrypted encoded digital content stored initially in the memory 212 without change makes it possible to make a complete copy of the same quality as the original of the encoded digital content 1 (511). In order to prevent the creation of copies without altered quality, the digital output portion 700 decrypts the set of encrypted encoded digital content stored in the memory 212 one time with the decryption mechanism 711 using the decryption key output by the decryption key storing portion 712 and changes and outputs the usable digital content. In this way, the set of encrypted encoded digital content output by the digital output portion 700 is output from the digital copy output 204 and sent to the copy destination storage device 200. The copy destination storage device 200 has the same constitution as the copy source storage device 200. The copy destination storage device receives the set of encrypted encoded digital content, decrypted once and output from the copy source storage device, from the digital copy input 205. The initial set of encrypted encoded digital content stored in the memory 212 of the copy source storage device is decrypted once and the quality of the usable encoded digital content is changed. As a result, the quality of the digital content usable by the copy source storage device, in the set of encrypted encoded digital content received, is less than the quality of the original digital content usable by the copy source storage device.

As above, in the first copying method relating to the present invention, the usable and original encoded digital content, in the set of encrypted encoded digital content stored in the memory of the copy source storage device, is made unusable by decryption and encoded digital content of lesser quality is made usable and output to the copy destination storage device. The quality of the content can thereby be degraded for each successive copy in the order determined by the creator of the set of encrypted encoded digital content. Moreover, the making of complete copies through digital copying can be prevented.

A second copying method relating to the present invention is explained next using FIG. 7. In the second copying method relating to the present invention, the making of complete copies through digital copying is prevented by degrading the quality of a digital content stored in the memory 212 of the copy source storage device and outputting that content to a copy destination storage device.

Figure 7:
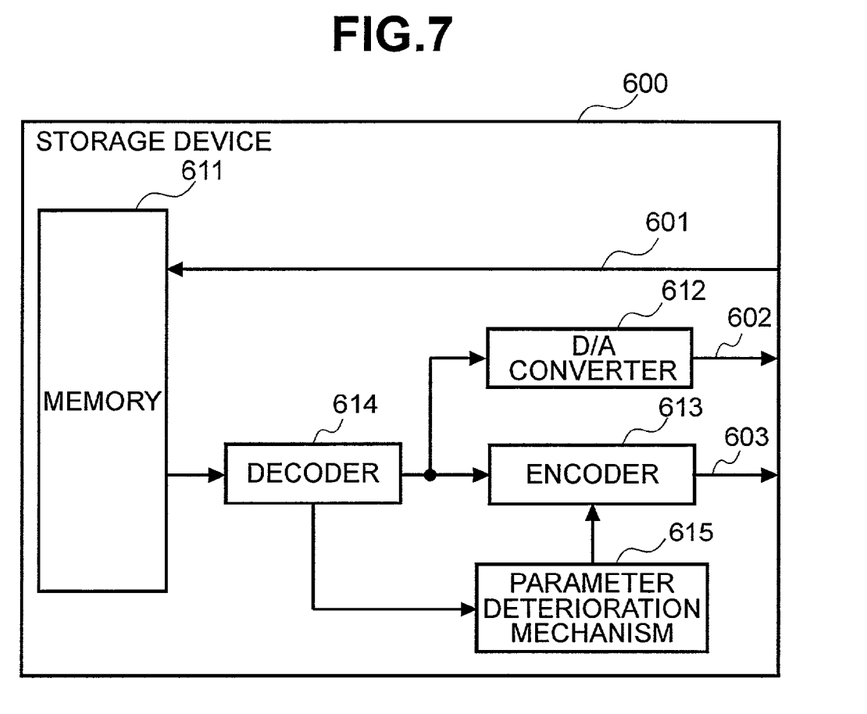
FIG. 7 is a drawing showing the constitution of the storage device 600 relating to the embodiment.

FIG. 7 is a drawing showing the constitution of the copy source storage device 600 and copy destination storage device 600 to which the second copying method is applied. The copy source storage device 600 and copy destination storage device 600 have the same constitution. In the second copying method, there is no portion corresponding to the data generating portion 300 shown in the first data generating method. Storage to the memory 611 is accomplished just by storing one copy of digital content simply encoded to the memory 611. The digital copy input 601 inputs original encoded digital content, or encoded digital content output from the digital copy output 603 of the storage device 600 or from another copy source storage device 600 and stores that content to the memory 611.

The decoder 614 decodes the encoded digital content stored in memory 611 and outputs the digital content to the D/A converter 612 and encoder 613. The D/A converter 612 converts the digital content output by the decoder 614 to analog content and outputs the analog content from the analog content output 602. The parameter deterioration mechanism 615 converts the encoding parameters of the digital content output by the decoder 614 to further deteriorated parameters and outputs the parameters to the encoder. The encoder 613 encodes the digital content output by the decoder 614 with the encoding parameters output from the parameter deterioration mechanism 615 and outputs the encoded content to the digital copy output 603.

The storage devices 600 stores digital content input from outside the system and outputs the content in an analog format to be played back or in a digital format to be copied. In order to prevent complete copying of digital contents, the storage device 600 degrades the quality of the digital content from that stored in the memory 611 and outputs that content when performing digital copying. When playing back the content, the storage device outputs the content only in the analog format.

For example, when high-quality digital content stored in memory 611 is played back, the digital content is decoded by the decoder 614, undergoes D/A conversion by the D/A converter 612, and is output in analog form through the analog content output 602. Because the digital content is degraded by D/A conversion, that content cannot be returned to the same quality as the original digital content by A/D conversion. Also, when high-quality digital content stored in memory 611 is copied, the digital content is decoded by the decoder 614, encoded by the encoder 613, and output outside the system through the digital copy output 603. The encoding parameters used by the encoder 613 are found by degrading the encoding parameters of the highest quality digital content stored in the memory 611 with the parameter deterioration mechanism 615. Because the encoding parameters of the digital content can be decoded by the decoder 614, those encoding parameters are deteriorated. For example, the encoding parameters are degraded by reducing the quantum bit number or sampling rate. Because the encoder 613 uses these degraded encoding parameters, the quality of the digital content output becomes degraded compared that of the highest quality digital content stored in memory 611. The creation of copies of equivalent quality from the digital content output is thereby prevented.

As above, with the second copying method relating to the present invention, the quality of the digital content stored in the memory of the copy source storage device is degraded and output to a copy destination storage device. Copying is thereby performed with the content in a degraded state. Also, digital copying of a complete copy can be prevented. The parameter deteriorating mechanism 615 automatically deteriorates the encoding parameters. Therefore, when a user outputs a digital copy from the memory 611, the user cannot touch those encoding parameters.

A third copying method relating to the present invention is explained next using FIG. 8. In the third copying method relating to the present invention, the usable encoded digital content in the set of encrypted encoded digital content stored in the memory of the copy source storage device is changed and output to a copy destination storage device, with encoded digital content which was previously usable deleted. Digital copying of a complete copy can thereby be prevented.

For digital output with the object of copying in the first copying method, the usable encoded digital content is changed by first decrypting the set of encrypted encoded digital content stored in the memory and the set of encrypted encoded digital content, wherein the encoded digital content of lesser quality is usable, is output. In the third copying method, however, the good quality encoded digital content, which is usable when stored in the memory, is removed from the set of encrypted encoded digital content before decryption.

Figure 8:
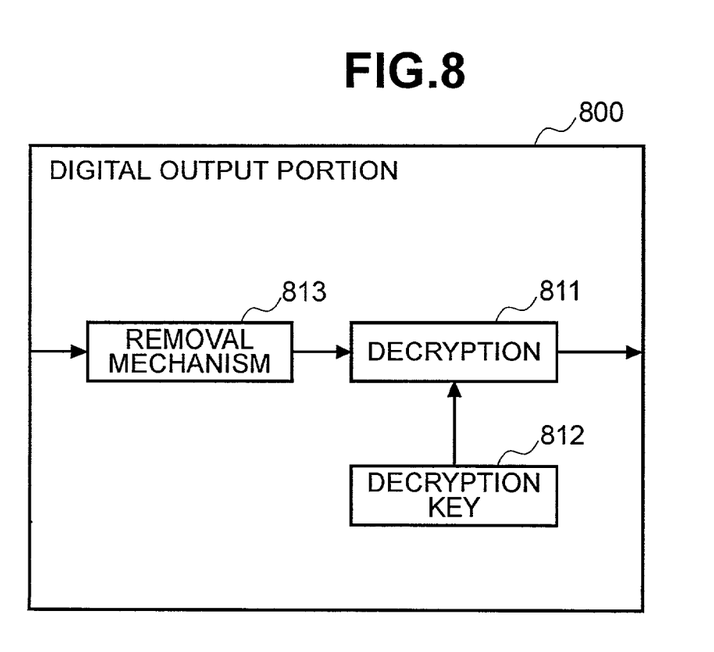
FIG. 8 is a drawing showing the constitution of the digital output portion 800 relating to the embodiment.

The storage device to which is applied the third copying method relating to the present invention is constituted by replacing the digital output portion 700 of the storage device 200 with the digital output portion shown in FIG. 8. Other elements constituting the storage device 200, such as the memory 212, data generating portion 300, and analog output portion 400, are the same as in the storage device 200 shown in FIG. 1. Specifically, the set of encrypted encoded digital content 500, in the data format shown in FIG. 5, is stored in the memory 212. The deletion mechanism 813 determines the usable encoded digital content from the set of encrypted encoded digital content stored in memory 212, removes that encoded digital content and the usability information corresponding thereto, and sends this content and information to the decryption mechanism 811. If there is no usable encoded digital content in the set of encrypted encoded digital content, the deletion mechanism 813 is just bypassed. The decryption mechanism 811 uses the decryption key output by the decryption key storing portion 812 and decrypts the set of encrypted encoded digital content sent from the deletion mechanism 813.

As above, in the third copying method relating to the present invention, the previously usable encoded digital content is removed and output from the set of encrypted encoded digital content stored in memory of the copy source storage device. The quality of the copied content can thereby be deteriorated in an order determined by the creator of the set of encrypted encoded digital content. Also, complete copying by digital copying can be prevented. Even if the encryption key is decoded, the use of high-quality digital content in copying is prevented.

Figure 9:
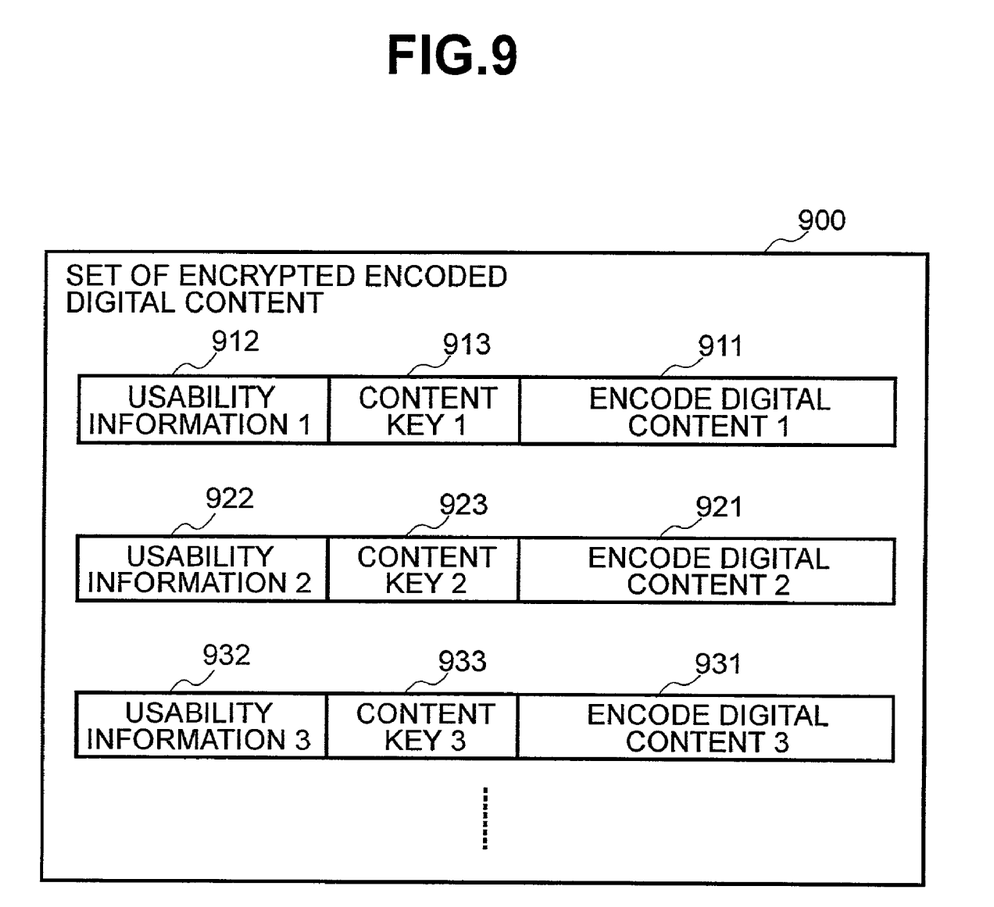
FIG. 9 is a drawing showing the data structure of the encrypted set of encoded digital content 900 relating to the embodiment.

Next, a fourth copying method relating to the present invention is explained using FIG. 9. The first copying method is a method wherein the encoded digital content itself is encrypted a plurality of times and decrypted each time a copy is made. The fourth copying method is a method wherein the encoded digital content is encrypted with mutually different content keys, and the content keys are encrypted a plurality of times and decrypted when a copy is made.

The set of encrypted encoded digital content 900 shown in FIG. 9 comprises encoded digital content 1 (911), 2 (921), 3 (931), content keys corresponding to each copy of encoded digital content 1 (913), 2 (923), 3 (933), and usability information corresponding to each content key 1 (912), 2 (922), 3 (932). This explanation uses three sets of encoded digital content, content keys, and usability information, but there is no limit to the number of these groups included in the set of encrypted encoded digital content.

Each copy of encoded digital content is encrypted with its content key 1 (913), 2 (923), 3 (933). The content keys 1 (913), 2 (923), 3 (933) may be the same encryption key or different encryption keys. Also, the content keys each have appended usability information corresponding thereto and are encrypted, along with the usability information, different numbers of times with the key K. The initial values V of the usability information appended to each of the content keys are all the same constant.

When the above mentioned set of encrypted encoded digital content 900 is copied from the copy source storage device to the copy destination storage device, the copy source storage device decrypts and outputs the content key and associated usability information one time. When the number of encryptions of the content key and usability information matches the number of copies, meaning the number of decryptions, of the set of encrypted encoded digital content 900, the content key and usability information are returned to a state wherein encryption has not been performed. At this time, the content key becomes usable. Also, the usability information matches the initial value V and shows that the content key is usable. The copy destination storage device can decrypt and use the encoded digital content using the corresponding content key. When the number of encryptions of the content key and usability information does not match the number of copies, meaning the number of decryptions, of the set of encrypted encoded digital content 900, the content key and usability information are in a state where encryption or decryption has been performed and cannot be used. As a result, the corresponding encoded digital content is unusable.

Consequently, it becomes possible to change the usable encoded digital content on the copy source storage device and copy destination storage device by performing decryption when a copy is made. Also, the relationship between the number of copies and the usable encoded digital content can be determined when the set of encrypted encoded digital content 900 is generated.

The constitution of the storage device to which the fourth copying method is applied has the same constitution as the storage device 200 shown in FIG. 1. However, the encryption mechanism 316 of the data generating portion 300 encrypts each copy of encoded digital content in the set of encrypted encoded digital content one time only with the corresponding content key. Also, the encryption mechanism 316 uses a separate encryption key and encrypts the usability information 1 (912) and content key 1 (913) zero times, the usability information 2 (922) and content key 2 (923) one time, and the usability information 3 (932) and content key 3 (933) two times. This decryption may also be applied to the encrypted encoded digital content. The decryption mechanism 711 of the digital output portion 700 decrypts the usability information and content key (and encoded digital content) corresponding to each copy of encoded digital content one time only. Also, the decoder 430 of the analog output portion 400 carries out processing to decrypt the usable encoded digital content with the corresponding content key.

As discussed above, with the fourth copying method relating to the present invention, the usable encoded digital content in the set of encrypted encoded digital content 900 is changed by performing decryption when a copy is made from the copy source storage device to the copy destination storage device. It thereby becomes possible to change the quality of the content each time a copy is made in an order determined by the creator of the set of encrypted encoded digital content. Also, digital copying of a complete copy can be prevented.

A second data generating method relating to the present invention is explained next. In the first data generating method, content data with a plurality of different qualities is generated by changing the encoded parameters of the input content and the set of encrypted encoded digital content is generated. For artistic digital content such as music or images, the quality of the digital content can be changed by changing encoding parameters such as the quantum bit number and sampling rate. On the other hand, for digital content with the object of transmitting information such as text, the quality of that digital content can be changed by changing the amount of information transmitted. In the second data generating method, therefore, data comprising content of reduced quality is generated by deleting or hiding by encryption part of the content input.

Figure 10:
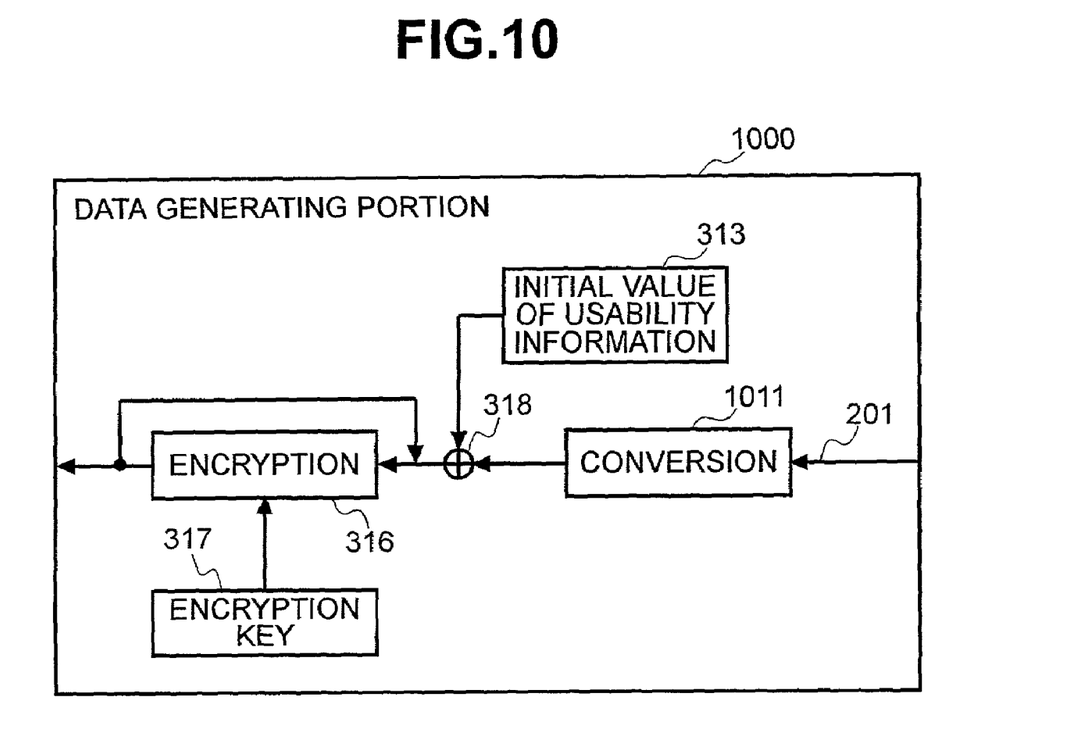
FIG. 10 is a drawing showing the constitution of the data generating portion 1000 relating to the embodiment.

The data generating device to which the second data generating method is applied has the constitution of the data generating device 100. However, the data generating device 100 has the constitution of the data generating portion 1000 shown in FIG. 10 instead of the data generating portion 300. The digital content input to the digital content input 201 in FIG. 1 is input to the data generating portion 1000. The data generating portion 1000 converts the input digital content to three sets of data, data 1, data 2, data 3, with mutually different portions deleted by the converting portion 1011. The conversion to data with part of the digital content deleted is performed by extracting the undeleted portions from the entire digital content. The amount of data output by the converting portion 1011 can be controlled from outside the system. Here, this amount is three, but may also be a number other than three. It is also possible to hide part of the data with encryption instead of deletion. In this case, the encryption key used for the encryption can be provided from outside the system. The three sets of converted data are data 1 with none of the input digital content deleted, data 2 with the final half of the input digital content deleted, and data 3 with the final three quarters of the input digital content deleted. Here, final portion means the portion of the input digital content input later by the data generating device 100. Final portion may also mean that portion used temporally later in normal use of the content. The scope of each deletion can be indicated from outside the data generating portion 1000. Of the encoded digital content, data 1 is entirely usable, data 2 is half usable, and for data 3, only one-quarter is not deleted. Accordingly, of the three sets of data, data 1 is of the highest quality, data 2 is of the next best quality, and data 3 is of the lowest quality. The three sets of data generated in this way have usability information added by the usability information adding portion 318 in the same way as in the first data generating method, are encrypted zero times, one time, and two times respectively using a shared key K by the encryption mechanism 316, and are collected in a single set of data, thereby having the same effect as the set of encrypted encoded digital content generated by the first data generating method. Performing decryption one time when a copy is made results in the generation of data for which the usable content can be changed in the order of data 1, data 2, data 3. This data becomes data of decreasing quality as copying is repeated.

As above, the data generated by the second data generating method relating to the present invention can have the usable content changed by decryption in the same way as the set of encrypted encoded data generated by the first data generating method relating to the present invention. Accordingly, the data generated by the second data generating method relating to the present invention can undergo the first, third, and fourth copying methods relating to the present invention.

A fifth copying method relating to the present invention is explained next using FIGS. 11, 12, and 13. In the fifth copying method relating to the present invention, complete copying by digital copying can be prevented by degrading the quality of the digital content stored in the memory of the copy source storage device 1 (1301) shown in FIG. 13 and outputting that content to the copy destination storage device 2 (1302). For artistic digital content such as music or images, the quality of the digital content can be degraded by changing encoding parameters such as the quantum bit number and sampling rate. On the other hand, for digital content with the object of transmitting information such as text, the quality of that digital content can be degraded by removing part of the transmitted information.

In the fifth copying method, there is no element corresponding to the data generating portion 300 shown in the first data generating method and storage to memory 1111 is accomplished just by storing the single copy of digital content to the memory 1111. The digital content input 1101 inputs and stores to memory 1111 original digital content or digital content output from the digital copy output 1102 of the storage device 1100 or digital content output from another copy source storage device 1100.

Figure 11:
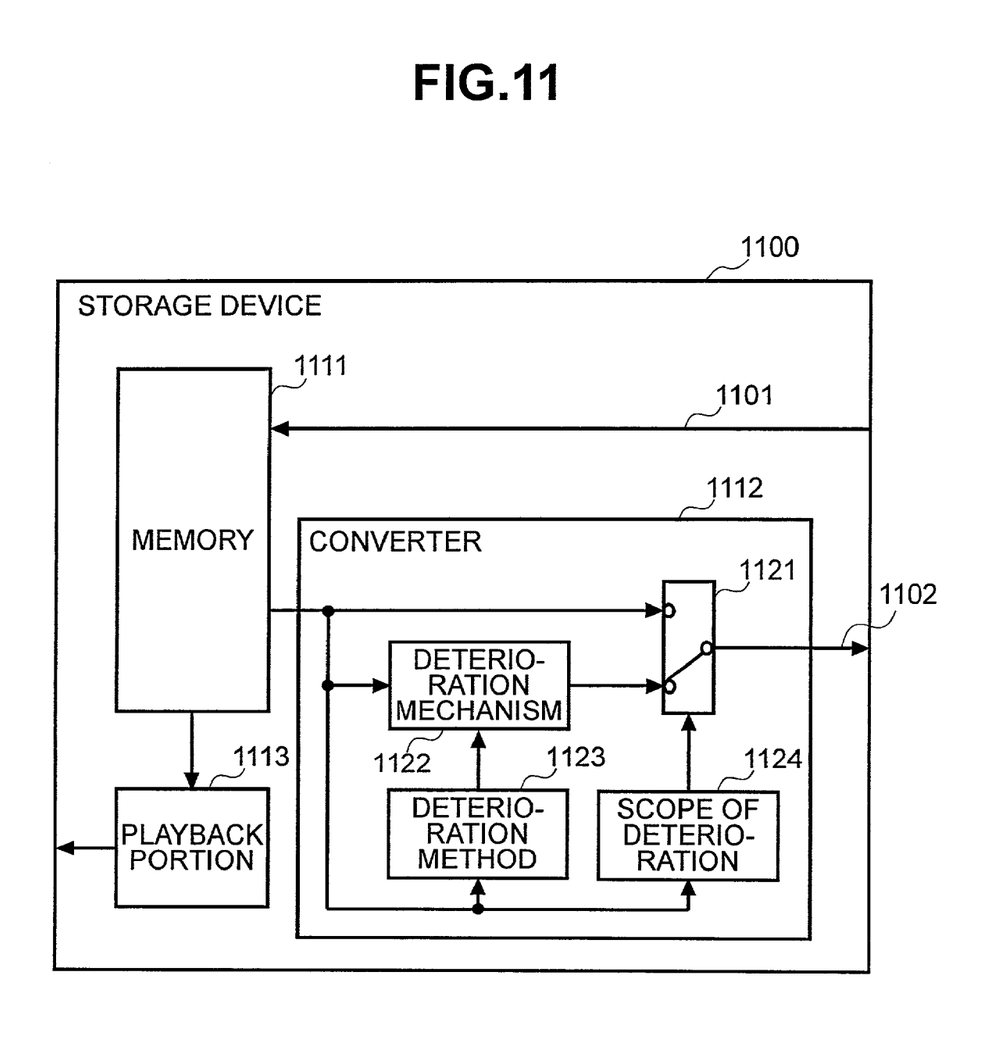
FIG. 11 is a drawing showing the constitution of the storage device 1100 relating to the embodiment.
Figure 13:
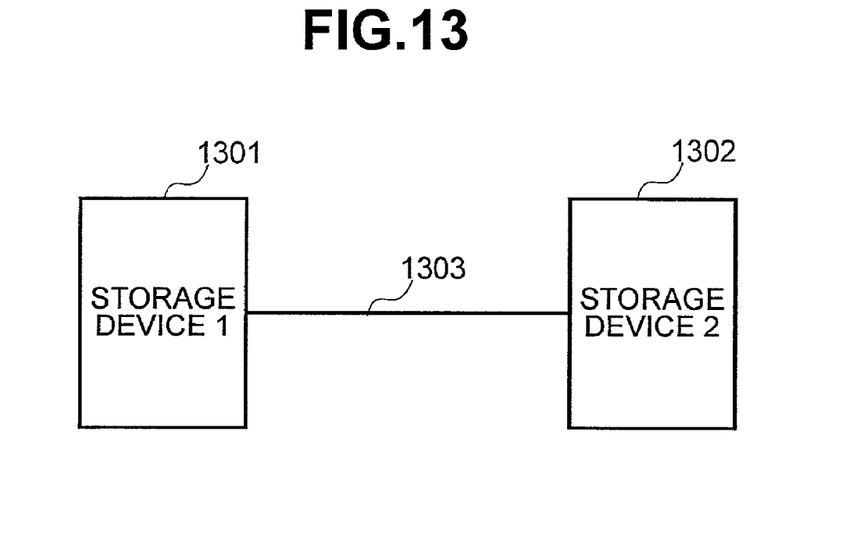
FIG. 13 is a drawing showing a system comprising a digital transmission path, a copy source storage device connected thereto, and a copy destination storage device, according to an embodiment of the invention.

The storage device 1 (1301) in FIG. 13 corresponds to the storage device 1100 shown in FIG. 11. The storage device 2 (1302) is a storage device comprising memory. The storage device 2 (1302) may also have the constitution of the storage device 1100 shown in FIG. 11. The storage device 1 (1301) processes and outputs the stored digital content through the digital transmission path 1303, and makes a copy of the digital content to the storage device 2 (1302). The digital transmission path 1303 can have any physical constitution, logical constitution, or scale so long as the storage device 1 (1301) and storage device 2 (1302) can be connected.

The storage device 1100 shown in FIG. 11 comprises a digital content input 1101, memory 1111, a converter 1112, and a digital copy output 1102. Furthermore, the storage device 1100 may also comprise a reproducing portion 1113 for playing back digital content stored in memory 1111. The memory 1111 stores digital content input from the digital content input 1101. The converter 1112 comprises a selector 1121, deteriorating mechanism 1122, deterioration method extracting portion 1123, and deterioration scope controller 1124. The converter outputs the digital content stored in the memory 1111, with part deleted or hidden by encryption, from the digital copy output 1102.

Figure 12:
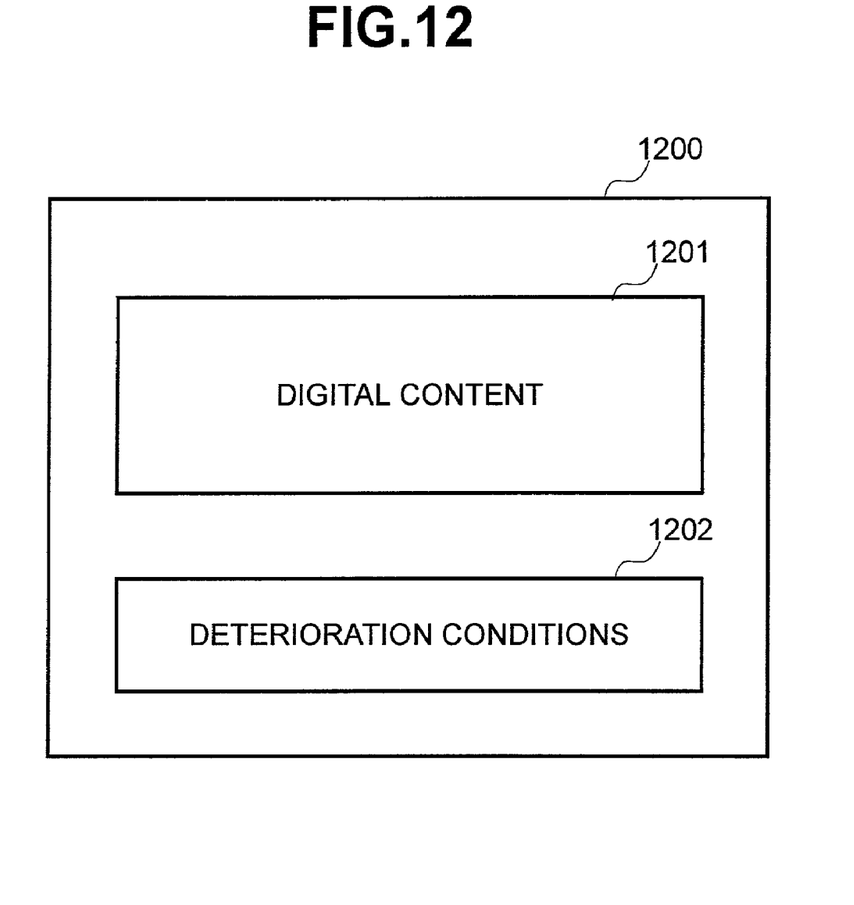
FIG. 12 is a drawing showing the digital content with appended deterioration conditions relating to the embodiment.

The digital content 1200, with added deterioration conditions, shown in FIG. 12 comprises digital content 1201 and deterioration conditions 1202. The digital content 1201 is digital data such as images, music, or text. The deterioration conditions 1202 are parameters indicating the scope and method for degrading the digital content 1201 when a digital copy is made of the digital content 1201.

The storage device 1100 stores the digital content input from the digital content input 1101 to the memory 1111. The input digital content may also be digital content 1200 with added deterioration conditions, wherein deterioration conditions 1202 showing the scope and method for deteriorating the digital content 1201 are added by the converter 1112 when a copy is made. When the stored digital content is output outside the system, the storage device 1100 limits the use of the copied content by deleting or hiding with encryption part of the digital content stored in memory 1111, degrading the quality of the content, and outputs the content. At this time, in the case of digital content 1200 with added deterioration conditions, the converter 1112 uses the added deterioration conditions 1202 and deletes or hides with encryption part of the digital content 1201 and outputs the content from the digital copy output 1102. At this time, the deterioration method extracting portion 1123 determines the deterioration method, such as encryption or deletion, from the deterioration conditions 1202 and controls the deterioration mechanism 1122. The deterioration scope controller 1124 determines the scope of deterioration from the deterioration conditions 1202 and controls the selector 1121. The selector 1121 receives the original digital content stored in memory 1111 and the digital content deteriorated by the deterioration mechanism 1122. And by control of the deterioration scope controller 1124, in each portion of the digital content the selector 1121 chooses the original digital content of the deteriorated digital contents, and outputs it from the digital copy output 1102. Thereby, the converter 1112 generates the digital content which deteriorated partially. The deterioration conditions 1202 can be applied when the digital content with added deterioration conditions 1200 is generated. In the case of digital content without added deterioration conditions, the converter 1112 uses predetermined conditions to delete or hide by decrypting part of the digital content and outputs the content from the digital copy output 1102. The predetermined conditions for the converter 1112 can be established when the storage device 1100 is manufactured.

When the reproduction portion 1113 plays back the digital content stored in the memory 1111 as digital data, the reproduction portion 1113 reproduces this data inside the storage device 1100. Therefore, it prevents taking out the complete copy of the digital content from the reproduction portion 1113 outside the system.

If digital content is text data, the reproduction portion 1113 outputs the screen information for displaying the text of contents to an external display out of the storage device 1100. In this case, because it is difficult to reconstruct text data from the screen information, it can prevent creating the complete copy of digital content from the output of a reproduction portion 1113.

On the other hand, when playing back digital contents as analog data, a reproduction portion 1113 outputs analog information to the display or speaker besides the storage device 1100. Consequently, it can prevent creating the complete copy of digital content from the output of a reproduction portion 1113.

Accordingly, with the fifth copying method relating to the present invention, a system 1300 comprises a storage device 1 (1301) and storage device 2 (1302) having the same constitution as the storage device 1100 and a digital transmission path 1303 connecting those; and the quality of the digital content copied to the storage device 2 (1302) is degraded compared to the digital content stored in the storage device 1 (1301), when the digital content is copied from the copy source storage device 1 (1301) to the copy destination storage device 2 (1302). Copying can thereby be performed with the content in a deteriorated state. Digital copying of a complete copy can be prevented as well.

The present invention has the effect of being able to support a user's desire to acquire digital content while protecting the rights of creators of digital content.

What is claimed is:

1. A method for generating protected digital content, the method comprising:

encoding a first digital content with a first encoding parameter to produce a first copy of digital content;

encoding the first digital content with a second encoding parameter different from the first encoding parameter to produce a second copy of digital content which is a deteriorated copy of the first digital content;

encoding the first digital content with a third encoding parameter different from the first and second encoding parameter to produce a third copy of digital content which is a deteriorated copy of the first digital content;

encoding the second copy of digital content with an encrypting key to produce a first encrypted copy of digital content;

encrypting twice the third copy of digital content with the encrypting key to produce a second encrypted coy of digital content; and combining the first copy of digital content and the first encrypted copy of digital content and the second encrypted copy of digital content to produce the protected digital content;

performing a first decryption of the protected digital content with the encrypting key to obtain the first copy of digital content, wherein the first decryption changes the protected digital content such that the first copy of digital content is no longer available in subsequent copying operations.

2. The method of claim 1 wherein the first copy of digital content has less information than the first digital content.

3. The method of claim 1 wherein the step of producing a first copy of digital content includes performing a data compression operation on the first digital content.

4. The method of claim 1 wherein the step of producing a first copy of digital content includes deleting a portion of the first digital content.

5. A method for generating protected digital content comprising:

producing a plurality of successive copies of a first digital content, each successive copy having a different level of quality;

encrypting each successive copy of a successively increasing number of times with an encrypting key to produce a plurality of successive encrypted copies, so that an $n^{th}$ successive encrypted copy is encrypted one more time than the $(n-1)^{th}$ successive encrypted copy with the encrypting key; and combining the first copy of the first digital content and the successive encrypted copies of the first digital content to produce the protected digital content;

wherein each successive copy is produced by encoding the first digital content using an encoding parameter different from the encoding parameters used to produce the other copies;

performing a first decryption of the protected digital content with the encrypting key to obtain the first copy of digital content, wherein the first decryption chances the protected digital content such that the first copy of digital content is no longer available in subsequent copying operations.

6. The method of claim 5 wherein the step of producing one or more successive copies includes encoding the first digital content.

7. The method of claim 5 wherein each of the successive copies of the first digital content is produced by applying one or more data compression operations on the first digital content one or more times.

8. The method of claim 5 wherein each of the successive copies of the first digital content is produced by deleting a portion of digital content from a preceding copy of the first digital content.

9. A method for copying protected digital content produced according to claim 5 comprising:

checking usability information associated with the protected digital content to identify a copy of the first digital content that can be decrypted with a single decrypting operation; and modifying the usability information associated with the protected digital content to indicate that the identified copy of the first digital content is no longer usable.

10. An apparatus for copying a protected digital content generated from a first digital content, comprising:

an encoder operable to produce one or more successive copies of the first digital content, each successive copy having a different level of quality;

an encryption mechanism operable to encrypt each successive copy of a successively increasing number of times to produce one or more successive encrypted copies, so that an nth successive encrypted copy is encrypted one more time than the (n-1)th successive encrypted copy with one encrypting key; and a digital output portion operable to combine the first copy of digital content and the successively encrypted copies to produce the protected digital content;

wherein the digital output portion further is operable to decrypt the protected digital content with the encrypting key to obtain one of the successive copies of the first digital content, wherein said one of the successive copies is rendered unusable in subsequent copying operations.

11. A storage device comprising:

an encoder operable to encode a first digital content with a first encoding parameter to produce a first copy of digital content, to encode the first digital content with a second encoding parameter different from the first encoding parameter to produce a second copy of digital content which is a deteriorated copy of the first digital content, and to encode the first digital content with a third encoding parameter different from the first and second encoding parameter to produce a third copy of digital content which is a deteriorated copy of the first digital content;

an encryption mechanism operable to encrypt the second copy of digital content to produce a first encrypted copy of digital content with a first encrypting key, to encrypt the third copy of digital content to produce a second encrypted copy of digital content with a second encrypting key, to encrypt the first encrypting key to produce a first encrypted key with a third encrypting key, and to encrypt twice the second encrypting key to produce a second encrypted key with the third encrypting key;

a data generating portion operable to combine the first copy of digital content, the first copy of encrypted copy of digital content, and the second encrypted copy of digital content to produce the protected digital content;

a decrypting mechanism operable to decrypt the protected digital content with the encrypting key to obtain one of the first digital copy of digital content, wherein the first decryption changes the protected digital content such that the first copy of digital content is no longer available in subsequent copying operations.

12. The storage device according to claim 11, further comprising: an output playback portion operable to produce output of the protected digital content in analog format.

13. The storage device according to claim 12, wherein the output playback portion further includes a deterioration mechanism that produces output of the protected digital content in a digital format having a degraded quality.

* * * * *